United States Patent
Modena et al.

(10) Patent No.: US 12,392,424 B2
(45) Date of Patent: Aug. 19, 2025

(54) FLOW REGULATOR

(71) Applicant: CAVAGNA GROUP S.P.A., Ponte S. Marco (IT)

(72) Inventors: Alessandro Modena, Padenghe sul Garda (IT); Vanni Zacche', Montichiari (IT)

(73) Assignee: Cavagna Group S.P.A., Ponte S. Marco (IT)

( * ) Notice: Subject to any disclaimer, the term of this patent is extended or adjusted under 35 U.S.C. 154(b) by 0 days.

(21) Appl. No.: 18/269,903

(22) PCT Filed: Dec. 21, 2021

(86) PCT No.: PCT/IB2021/062091
§ 371 (c)(1),
(2) Date: Jun. 27, 2023

(87) PCT Pub. No.: WO2022/144690
PCT Pub. Date: Jul. 7, 2022

(65) Prior Publication Data
US 2024/0060575 A1  Feb. 22, 2024

(30) Foreign Application Priority Data
Dec. 30, 2020  (IT) .................. 102020000032888

(51) Int. Cl.
*F16K 39/02* (2006.01)
*F16K 1/10* (2006.01)
(Continued)

(52) U.S. Cl.
CPC ............. *F16K 39/024* (2013.01); *F16K 1/10* (2013.01); *F16K 1/487* (2013.01); *F16K 47/023* (2013.01)

(58) Field of Classification Search
CPC .......... F16K 1/10; F16K 1/487; F16K 39/024; F16K 47/023
See application file for complete search history.

(56) References Cited

U.S. PATENT DOCUMENTS

| | | |
|---|---|---|
| 2010/0148108 A1 | 6/2010 | Glaun |
| 2015/0090918 A1 | 4/2015 | Smiddy et al. |
| 2022/0384828 A1* | 12/2022 | Zeiser ............... H01M 8/04761 |

FOREIGN PATENT DOCUMENTS

| | | |
|---|---|---|
| CN | 111765253 | 10/2020 |
| DE | 1126188 | 3/1962 |

(Continued)

OTHER PUBLICATIONS

Search Report & Written Opinion issued in PCT/IB2021/062091 (Apr. 14, 2022).

*Primary Examiner* — Atif H Chaudry
(74) *Attorney, Agent, or Firm* — Barnes & Thornburg LLP

(57) ABSTRACT

A flow regulator comprising a housing having a first chamber, a second chamber and a valve seat which is arranged between these chambers, a valve head which is arranged in the first chamber and which has at least a first surface which faces the first chamber, a second surface which faces the second chamber when the valve head is in a closed position and a through-hole between the first surface and second surface, the valve head being movable between an open position and a closed position, a shaft which is capable of moving the valve head between the open and closed positions, and an engaging pin which is at least partially received in the hole of the valve head in a sliding manner, the engaging pin being capable of moving with respect to the valve head between at least one non-sealed position and one sealed position, and being in this at least one non-sealed position when the valve head is in the open position and (Continued)

being capable of moving into the non-sealed position when the valve head is in the closed position.

9 Claims, 5 Drawing Sheets

(51) Int. Cl.
*F16K 1/48* (2006.01)
*F16K 47/02* (2006.01)

(56) References Cited

FOREIGN PATENT DOCUMENTS

| DE | 2034273 | 1/1972 | | |
|---|---|---|---|---|
| JP | 2011064245 | 3/2011 | | |
| WO | WO-2020138307 A1 * | 7/2020 | ........... | F01D 17/145 |

* cited by examiner

FLOW REGULATOR

CROSS REFERENCE TO RELATED APPLICATIONS

This application is a U.S. nationalization under 35 U.S.C. § 371 of International Application No. PCT/IB2021/062091, filed 21 Dec. 2021, which claims priority to Italian Patent Application No. 102020000032888, filed 30 Dec. 2020. The disclosures set forth in the referenced applications are incorporated herein by reference in their entireties.

TECHNICAL FIELD

The present invention relates to a flow regulator, such as, for example, a regulation valve, which is mainly intended to regulate flows of fluids at a high flow rate, having the features set out in the preamble of the main claim.

TECHNOLOGICAL BACKGROUND

There are known in the prior art valve groups for intercepting a fluid which flows inside a system of pipes.

Typically, such valve groups comprise a housing which has a first chamber, a second chamber, a valve seat which is arranged between the first chamber and the second chamber, and a valve head which is arranged in this housing and which is movable with respect thereto between an open position spaced apart from the seat of the valve and a closed position which is engaged with the seat of the valve.

CN111765253 A describes a stop valve which has a main valve and an auxiliary valve; when an operator rotates the handwheel in order to open the valve, the auxiliary valve is opened for first bringing about a reduction in the pressure difference between the two chambers, making the main valve easier to open.

DE1126188 B describes a valve of a motor brake comprising a main valve and a secondary valve. The secondary valve, being smaller than the main valve, can be opened by applying a rather low force; once the secondary valve is open, the main valve can be opened with a smaller force.

DE2034273 A1 describes a shut-off valve for water pipes which has a main valve and a secondary valve and the operation of which is controlled by a compression spring.

In the case of fluids having high flow rates, these valve groups have a throughflow in favour of the closure geometry.

An example of such valves is the one described in US2014/0137969 A1; this patent sets out a valve group having a main shut-off valve and a check valve. Since the closure of the main valve can generate a pressure difference between the two chambers, particularly in the case of fluids with a high flow rate, the re-opening of the valve itself can be difficult. The patent is intended to limit this phenomenon by providing a check valve which allows re-balancing of the pressure between the two chambers when the main valve is closed, eliminating or limiting the accumulation of pressure generated in the region of the head of the valve itself.

However, this valve group does not handle the water hammers which can be generated following the closure of the main valve itself.

In fact, it is known in the prior art that, when the flow of a fluid is abruptly interrupted following the sudden closure of a shut-off valve, there is generated a pressure shock wave which is called water hammer.

The pressure which is generated in these cases is a function of the dimensions of the pipe (length and diameter), the speed and the density of the fluid and the closure time of the valve itself.

In some cases, the intensity of the shock and the value of the maximum pressure of the shock wave can reach such levels as to cause the pipes to explode.

Attenuation devices for the water hammer exist, such as the ones described in US2014/261828 A1, or pressure discharge members of the in-line type, such as the one described in US2003159743 A1, but such systems are not applicable for controlling the water hammers in the case of fluids with a high flow rate.

In the technical sector being referred to, therefore, there remains the need to regulate the flow of fluids having high flow rates in order to control the water hammers.

STATEMENT OF INVENTION

The problem addressed by the present invention is to provide a flow regulator for high-pressure fluids which is functionally configured to overcome the limitations set out above with reference to the cited prior art.

In the context of this problem, an object of the invention is to provide a flow regulator which allows control of the water hammers which are generated following the sudden interruption of the flow itself.

This problem is solved and this object is achieved by the present invention by means of a flow regulator according to the appended claims.

In a first aspect thereof, therefore, the present invention is directed towards a flow regulator comprising:
  a housing having a first chamber, a second chamber and a valve seat which is arranged between the first chamber and second chamber;
  a valve head which is arranged in the first chamber and which has at least a first surface which faces the first chamber, a second surface which faces the second chamber when the valve head is in a closed position and a through-hole between the first surface and second surface, the valve head being movable between an open position, spaced apart from the valve seat, and a closed position engaged with the valve seat;
  a shaft of the valve head which is capable of moving the valve head between the open and closed positions, and
  an engaging pin which is at least partially received in the hole of the valve head in a sliding manner, the engaging pin being capable of moving with respect to the valve head between at least one non-sealed position, in which the fluid communication between the first chamber and the second chamber is allowed, and a sealed position, in which the fluid communication between the first chamber and the second chamber is prevented, the engaging pin being in the at least one non-sealed position when the valve head is in the open position and being capable of moving into the non-sealed position when the valve head is in the closed position.

Therefore, the flow regulator has at least three operating positions: a first position, the open position, in which the valve head is in an open position spaced apart from the valve seat and the engaging pin is in a non-sealed position, a second position, the closed position, in which the valve head is in a closed position engaged with the valve seat and the engaging pin is in a non-sealed position, and a third position, the sealed position, in which the valve head is in a closed position and the engaging pin is in the sealed position.

This allows a system for interrupting the flow of a fluid in a regulated way, because the fluid changes from a normal flow rate, when the flow regulator is in the open position, to a lower flow rate, when the flow regulator is in the closed position, to a situation without any flow, when the flow regulator is in the sealed position.

This advantageously allows control of the water hammers which could be generated following a rapid interruption of the flow itself.

The person skilled in the art is capable of suitably sizing, for controlling the water hammer, the engaging pin and the flow which is brought about when the valve head is in the closed position and the engaging pin is in the non-sealed position in the context of the normal design activity.

Furthermore, this advantageously prevents lamination effects from being produced during the change from one flow situation with normal flow rate to a situation without any flow. However, these lamination effects can be produced when closing a valve of the conventional type and can lead to sudden closures of the valve head.

This flow regulator, by preventing sudden closures of the valve as a result of lamination effects, consequently further facilitates the control of the water hammers.

Preferably, the engaging pin is secured to the shaft and can be movable between the at least one non-sealed position and the sealed position by means of the shaft.

Advantageously, it is thereby possible to control the movement of the valve head from the open position to the closed position and of the engaging pin between the at least one non-sealed position and the sealed position by acting on a single element.

In one embodiment, the engaging pin has a first head, a second head and a rod, the second head being secured to the shaft and being capable of retaining the valve head at the side of the first surface, the first head being capable of retaining the valve head at the side of the second surface, the rod being at least partially received in the through-hole between the first surface and the second surface of the valve head, the engaging pin being able to slide in the hole between the at least one non-sealed position, in which the second head of the engaging pin is not in abutment against the first surface of the valve head, and the sealed position, in which the first head of the engaging pin is in abutment against the first surface of the valve head.

This advantageously allows a compact and robust flow regulator to be provided.

In some embodiments, the flow regulator comprises at least one resilient element which is capable of acting counter to the movement of the engaging pin from the at least one non-sealed position to the sealed position.

In this manner, the resilient element is what ensures that the engaging pin remains in the non-sealed position during the closure of the valve head and which moves into the sealed position only after the valve head is closed so as to prevent lamination effects during the closure of the valve head which involve a sudden closure of the entire flow regulator.

Therefore, there is produced a first flow reduction by means of the closure of the valve head on the valve seat while only afterwards, following the action on the resilient element, is the total stoppage of the flow produced by means of the movement of the engaging pin from the at least one non-sealed position to the sealed position.

The person skilled in the art is capable of suitably selecting the resilient element and the resilient force thereof so as to act counter to the movement of the engaging pin from the at least one non-sealed position to the sealed position as a function of the specific fluid and the flow rate thereof in the context of normal design activity.

Another advantage of the present invention is that, for the same dimensions of the valve seat, it is possible to adapt the flow regulator to different types of fluid having different pressures by suitably varying the geometry of the engaging pin and the resilient element which can act counter to the movement of the engaging pin from the at least one non-sealed position to the sealed position.

Another advantage is that, when the flow regulator is in the sealed position, there is the geometric imbalance only of the section which serves to regulate the water hammer and therefore of the section of the flow given by the engaging pin and the relevant portion to the resilient load of the resilient element itself.

This allows easier re-opening of the valve with respect to a conventional valve without such flow regulation system.

Furthermore, this also involves the possibility of standardizing the opening torque of the flow regulator by appropriately selecting the geometry of the engaging pin and the resilient element, independently of the dimensions of the valve seat.

Another advantage is that this resilient element allows a gradual pressure of the valve head on the valve seat during the closure of the valve head itself, reducing possible vibrations which can also be considerable during the closure of a normal disk type valve and therefore increasing the robustness of the flow regulator.

This resilient element may be, for example, a compression spring which is interposed between the second head of the engaging pin and the first surface of the valve head or a traction spring which is interposed between the first head of the engaging pin and the second surface of the valve head.

Preferably, the resilient element is a compression spring which is interposed between the second head of the engaging pin and the first surface of the valve head.

This allows the engaging pin to be moved from the at least one non-sealed position to the sealed position by means of compression of the spring itself.

In a generally similar manner, the engaging pin moves from the sealed position to the at least one non-sealed position by extension of the same compression spring.

This compression spring may be received in a corresponding containment seat which is formed in the first surface of the valve head or in a first surface of the second head of the engaging pin, the first surface facing the first surface of the valve head or partially in the first surface of the valve head and partially in the first surface of the second head of the engaging pin.

This containment seat allows the compression spring to be retained in the seat during the compression or extension thereof, limiting possible malfunctions, and allows the mechanism with which the control of the flow is brought about to be made more compact.

In some embodiments, the containment seat for the compression spring is coaxial with respect to the through-hole between the first surface and the second surface of the valve head and the rod of the engaging pin is at least partially received in the internal space of the compression spring.

This allows the mechanism for regulating the flow to be made even more compact and robust.

In some embodiments, the engaging pin comprises at least one first channel for the fluid communication between the first chamber and the second chamber, the at least one first channel being at least partially constructed in the rod and being open for passage when the engaging pin is in the at least one non-sealed position and inaccessible when the engaging pin is in the sealed position.

In one embodiment, the flow regulator comprises at least one passage for the fluid communication between the first chamber and the second chamber, the at least one passage being constructed between the engaging pin and the through-hole between the first surface and the second surface of the valve head and being open for passage when the engaging pin is in the at least one non-sealed position and inaccessible when the engaging pin is in the sealed position.

The person skilled in the art is capable of configuring the geometry of the engaging pin and suitably sizing the channel and/or the passage for the fluid communication and the control of the water hammers in the context of individual ordinary activities.

Preferably, the flow regulator comprises an annular fluid-tight seal on the second surface of the valve head which is capable of moving into abutment against the valve seat when the valve head is in the closed position.

This annular fluid-tight seal allows the valve head to close in a fluid-tight manner on the valve seat when the valve head is in the closed position.

Preferably, the flow regulator comprises an annular fluid-tight seal on the first surface of the valve head or, alternatively, on the first surface of the second head of the engaging pin, which is capable of moving into abutment against the first surface of the second head of the engaging pin or against the first surface of the valve head, respectively, when the engaging pin is in a sealed position.

This annular fluid-tight seal allows the first surface of the second head of the engaging pin to close in a fluid-tight manner on the first surface of the valve head when the engaging pin is in the sealed position.

Preferably, the first chamber has a through-hole and the shaft extends through the hole of the first chamber so as to project at a first end outside the first chamber, the shaft being secured at a second end to the engaging pin.

This allows an operator to act on the shaft and, consequently, on the valve head and on the engaging pin.

Preferably, the shaft is secured at the first end thereof to a handwheel.

This allows the valve head to be moved between the closed position and the open position and the engaging pin to be moved between the non-sealed position and the sealed position by rotating the handwheel itself.

The features and advantages of the invention will be better appreciated from the following detailed description of a preferred embodiment thereof which is illustrated by way of non-limiting example with reference to the appended drawings, in which.

With reference to the appended Figures, there is generally designated 1 a flow regulator according to the present invention.

Figure 1:
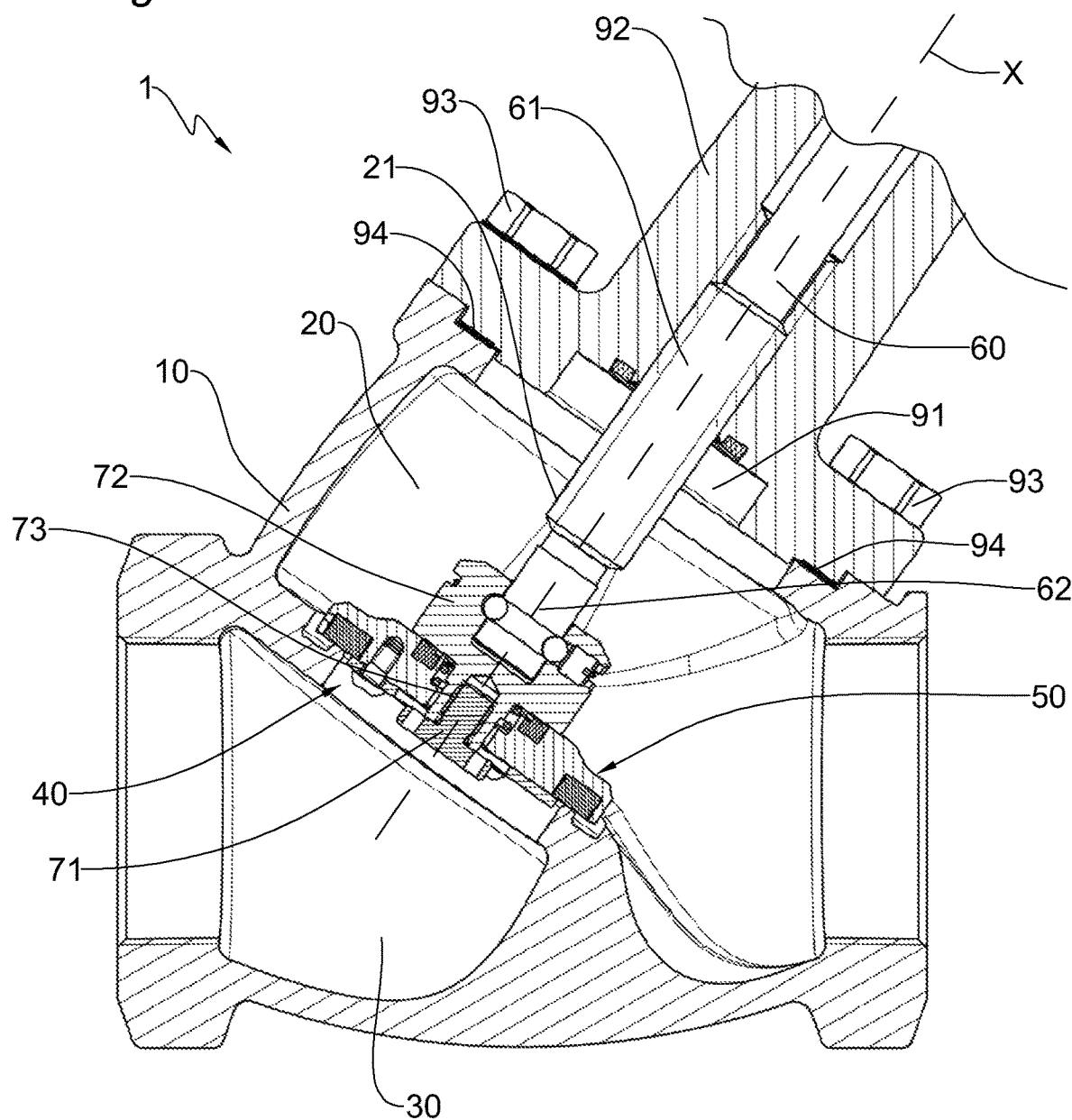
FIG. 1 is a schematic cross-sectional view of a flow regulator according to a first embodiment.

FIG. 1 shows a flow regulator 1 which comprises, in terms of the most general units thereof, a housing 10 with a first chamber 20, a second chamber 30 and a valve seat 40 which is arranged between the two chambers 20, 30.

The flow regulator is typically connected to a system of tubes (not shown in the Figures).

In use, the fluid moves from the first chamber 20, the inlet chamber, to the second chamber 30, the outlet chamber.

A valve head 50 is arranged in the housing 10, preferably in the first chamber 20 and is capable of moving into abutment against the valve seat 40 thereof.

In particular, such a valve head 50 is movable with respect to the valve seat 40 between an open position, in which it is spaced apart from the valve seat 40, and a closed position, in which it is engaged with the valve seat 40.

Figure 2:
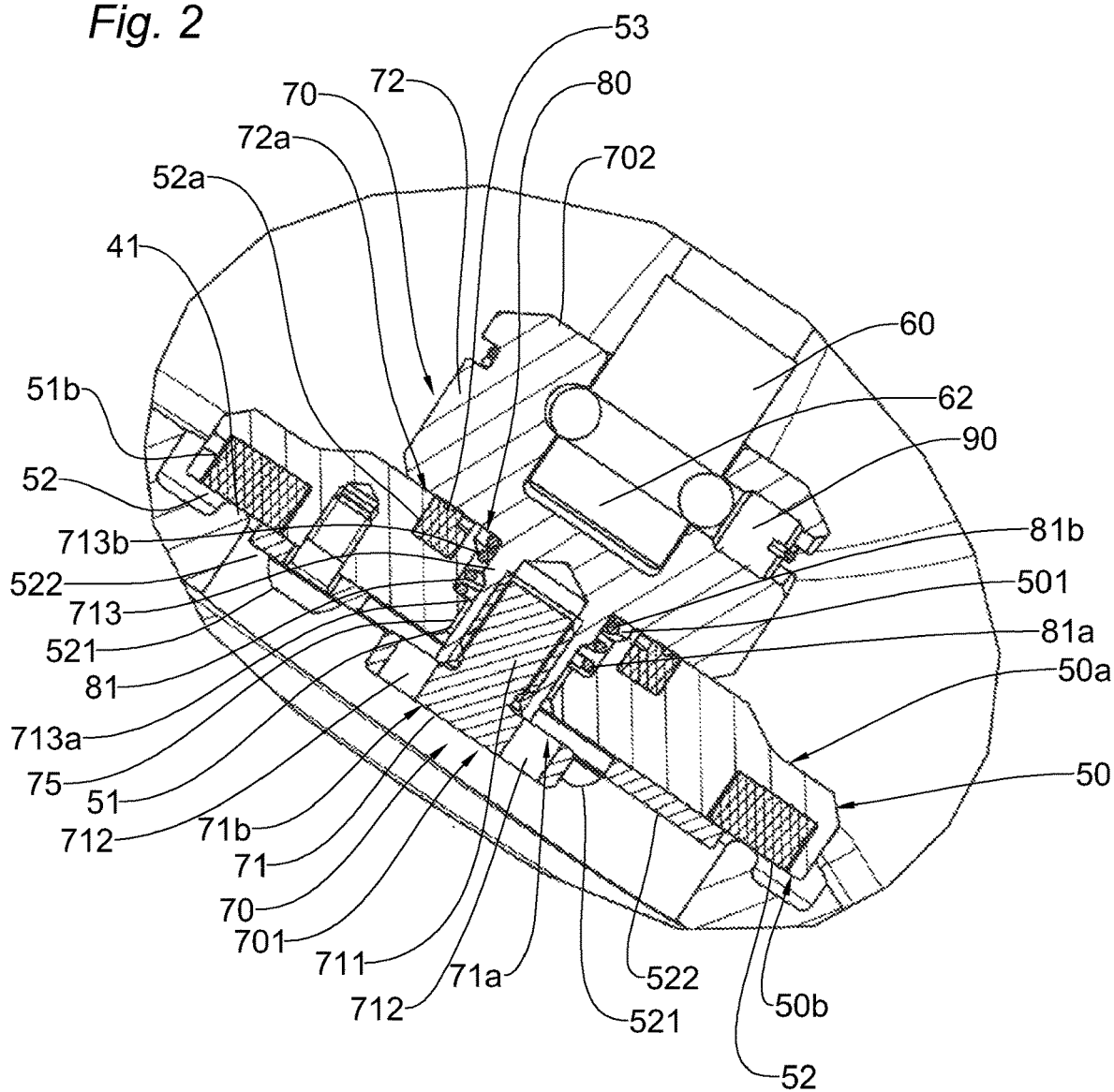
FIG. 2 is a schematic cross-sectional view of a detail of the flow regulator of FIG. 1.

As shown in FIG. 2, the valve seat 50 has a first surface 50a and a second surface 50b. When the valve head 50 is in the closed position, the first surface 50a faces the first chamber 20 and the second surface 50b faces the second chamber 30.

Preferably, this valve head 50 is of the disk type.

The valve head 50 further has a through-hole 51 between the first surface and the second surface 50a, 50b.

The flow regulator 1 comprises a shaft 60 which extends along an axis X and which is capable of moving the valve head 50 along the axis X between the open and closed positions.

The through-hole 51 of the valve head 50 has a circular cross-section with an axis which coincides with the axis X.

The flow regulator 1 further comprises an engaging pin 70.

The shaft 60 has a first end 61 and a second end 62 and is secured to the engaging pin 70 at the second end 62 thereof.

The shaft is further provided with a thrust bearing device 90, such as, for example, a ball bearing, so as to generate a 20 disconnection between the shaft 60 and the engaging pin 70, as set out in FIG. 2, and to prevent wear phenomena.

This engaging pin 70 is partially received in the through-hole 51 of the valve head 50 and is capable of moving with respect 25 thereto between at least one non-sealed position, in which it permits the fluid communication between the two chambers 20, 30, and a sealed position, in which it prevents the fluid communication between the two chambers 20, 30.

The engaging pin 70 is composed of two members, a screw 701 and a piston 702 which are fixedly joined to each other.

In the embodiment of FIG. 1, the screw 701 has a head 71 which can retain the valve head 50 at the side of the second surface 50b and a rod 711 which extends into the hole 51 of the valve head 50 itself. The head 71 has a first surface 71a which is directed towards the second surface 50b of the valve head 50 and a second surface 71b which is directed towards the second chamber 30 when the valve head 50 is in the closed position.

Figure 4:
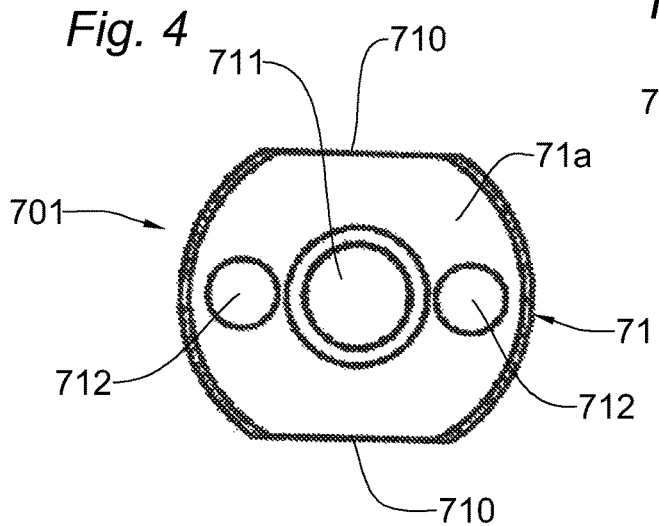
FIG. 4 is a schematic plan view, from above, of the detail of FIG. 3.
Figure 3:
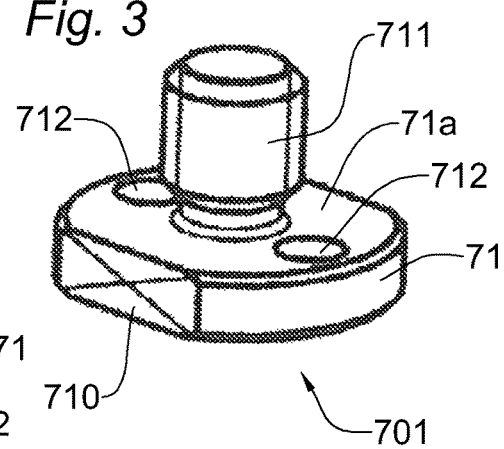
FIG. 3 is a schematic perspective side view, from above, of a detail of the flow regulator of FIG. 1.

The head 71 has two through-holes 712 between the first surface and second surface 71a, 71b, as can be seen in FIGS. 3 and 4.

The piston 702 has a head 72 which can retain the valve head 50 at the side of the first surface 50a and a cylindrical elongate portion 713 which extends into the hole 51 of the valve head 50 itself and which has a cavity 713a which can receive the rod 711 of the screw 701 in a secured manner. In particular, the cavity 713a of the piston 702 is threaded; the rod 711 of the screw 71 is also threaded and they are configured to be screwed together.

The through-hole 51 of the valve head 50 receives in a sliding manner the cylindrical elongate portion 713 of the piston 702.

The head 72 of the piston 702 has a first surface 72a which is directed towards the first surface 50a of the valve head 50 and which is cable of moving into abutment against the first surface 50a when the engaging pin is in the sealed position.

The first surface 50a of the valve head 50 has a containment seat 501 which has a cylindrical shape and which is capable of receiving a compression spring 81.

The compression spring 81 therefore has a first base 81a which is supported on the first surface 50a of the valve head 50 in the containment seat 501 and a second base 81b which is in contact with the first surface 72a of the piston 702.

The compression spring 81 has such dimensions as to extend outside a portion 713b of the cylindrical elongate portion 713 of the piston 702; in particular, the portion 713b of the cylindrical elongate portion 713 of the piston 702 is at least partially received in the internal space 81c of the compression spring 81.

The compression spring 81 is capable of acting counter to the movement of the engaging pin 70 from the non-sealed position to the sealed position.

In particular, the containment seat 501 has such dimensions as to completely receive the compression spring 81 when the engaging pin is in the sealed position, that is to say, when the first surface 72a of the piston 702 is in abutment against the first surface 50a of the valve head, but not when the engaging pin is in the non-sealed position, that is to say, when the first surface 72a of the piston 702 is not in abutment against the first surface 50a of the valve head.

In this manner, the compression spring 81 maintains the engaging pin 70 in the non-sealed position when the valve head 50 is open.

The main axis of the containment seat 501, the compression spring 81, the cylindrical elongate portion 713 of the piston 702 and the rod 711 of the screw 701 coincide with the axis X.

The radial dimensions of the cylindrical elongate portion 713 are less than those of the hole 51, thereby generating a passage 75 between the cylindrical elongate portion 713 and the hole 51 for the fluid communication between the first chamber 20 and the second chamber 30. This passage 75 is open for passage between the two chambers 20, 30 when the engaging pin 70 is in the non-sealed position but is inaccessible when the engaging pin 70 is in the non-sealed position. In this manner, when the engaging pin 70 is in the non-sealed position, there is fluid communication between the first chamber 20 and the second chamber 30 through the passage 75 and the through-holes 712 of the head 71 of the screw 701, while this communication is prevented when the engaging pin 70 is in the sealed position, that is to say, when the first surface 72a of the head 72 of the piston 702 is in abutment against the first surface 50a of the valve head 50.

In a construction variant, the head 71 of the screw 701 has, in place of the through-holes 712, milled portions which are formed on the first surface 71a; in this case, the fluid communication between the first chamber 20 and the second chamber 30 when the engaging pin 70 is in the non-sealed position is brought about by means of the passage 75 and the milled portions of the head 71 of the screw 701.

By acting by means of the shaft 60 which is secured to the engaging pin 70 which is in turn secured to the valve head 50, the operator initially moves the flow regulator 1 from the first position to the second position, by closing the valve head 50, and then moves it from the second position to the third position by moving the pin from the non-sealed position to the sealed position, thereby compressing the compression spring 81 by means of the piston 702 in the containment seat 501 until the first surface 72a of the head 72 of the piston 702 moves into abutment against the first surface 50a of the valve head 50.

As FIGS. 3 and 4 show, the head 71 of the screw 701 has a circular cross-section which is truncated along two parallel chords 710, for example, and which is obtained by means of two milled portions, in order to facilitate the tightening of the screw 701 with respect to the piston 702.

There is provided on the second surface 50b of the valve head 50 an annular fluid-tight seal 52 which can move into abutment against the valve seat 40 when the valve head 50 is in the closed position, in particular the second surface 50b of the valve head 50 has a containment seat 51b which has an annular shape and which can receive the annular fluid-tight seal 52. The annular fluid-tight seal 52 can be retained in the containment seat 51b thereof by suitable fixing elements, such as, in a non-limiting example of FIG. 2 of the containment of the position of the seal 52 in the containment seat 51b thereof, screws 521 and washers 522.

The valve seat 40 is provided with a bead 41 which projects from the valve seat towards the first chamber 20 in such a manner that, when the valve head 50 is closed, the annular fluid-tight seal 52 present on the second surface 50b of the valve head 50 itself moves into abutment against the bead 41, improving the seal of the valve head 50.

There is present on the first surface 50a of the valve head 50 an annular fluid-tight seal 53 which can move into abutment against the first surface 72a of the piston 702; in particular, the first surface 50a of the valve head 50 has a containment seat 52a which has an annular shape and which can receive the annular fluid-tight seal 53.

With reference to FIG. 1, the first chamber 20 has a through-hole 21 and the shaft 60 has the first end 61 which leaves the first chamber 20 via the hole 21.

This first end 61 extends inside a friction ring 91 and is contained in a flanged member 92 which is fixedly joined to the first chamber 20 at the hole 21 by means of screws 93.

In the contact zone between the flanged member 92 and the first chamber 20, there is further present an annular seal 94.

Figure 5:
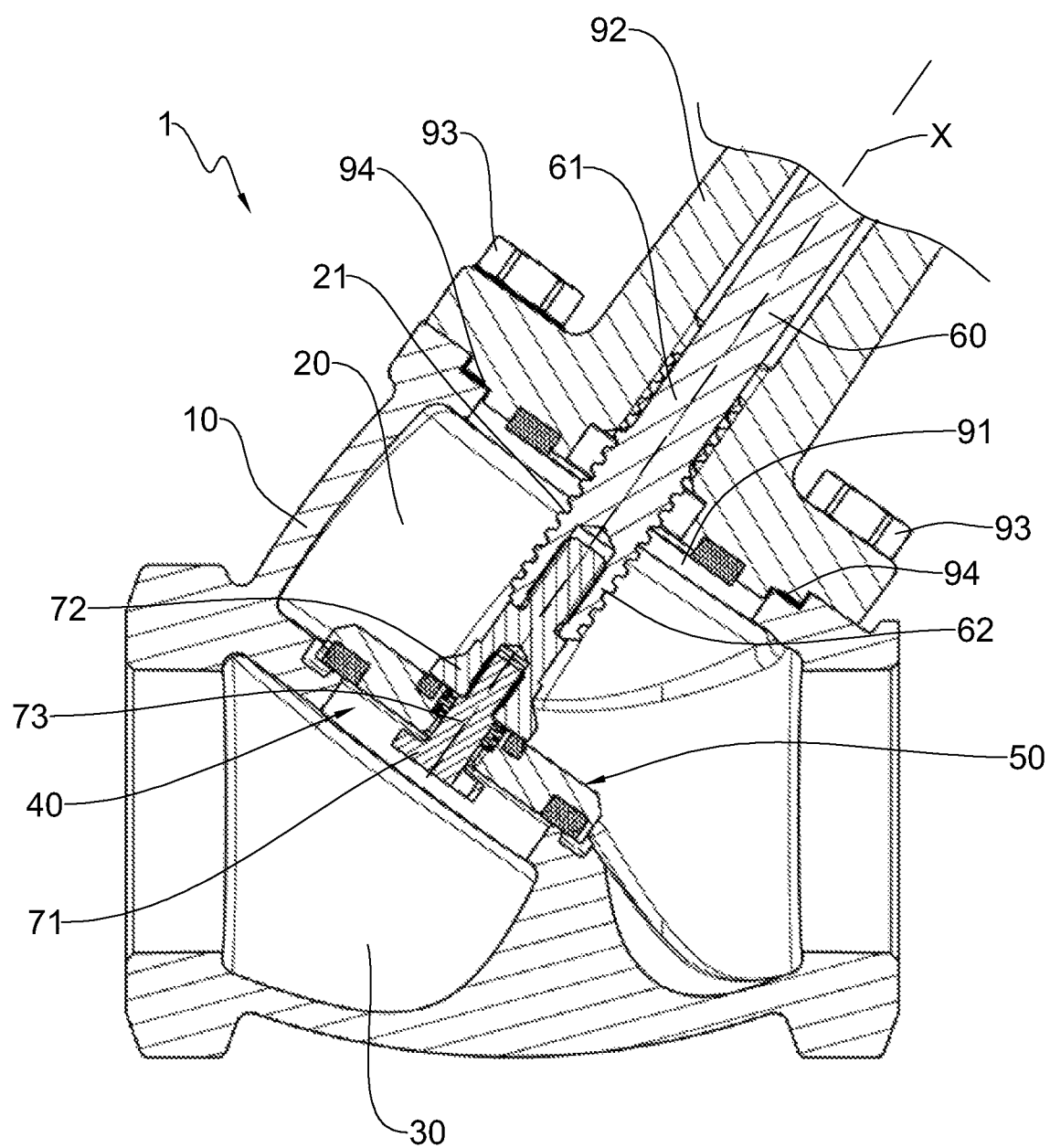
FIG. 5 is a schematic cross-sectional view of a flow regulator according to another embodiment.

FIG. 5 shows an additional embodiment of the flow regulator 1.

Figure 6:
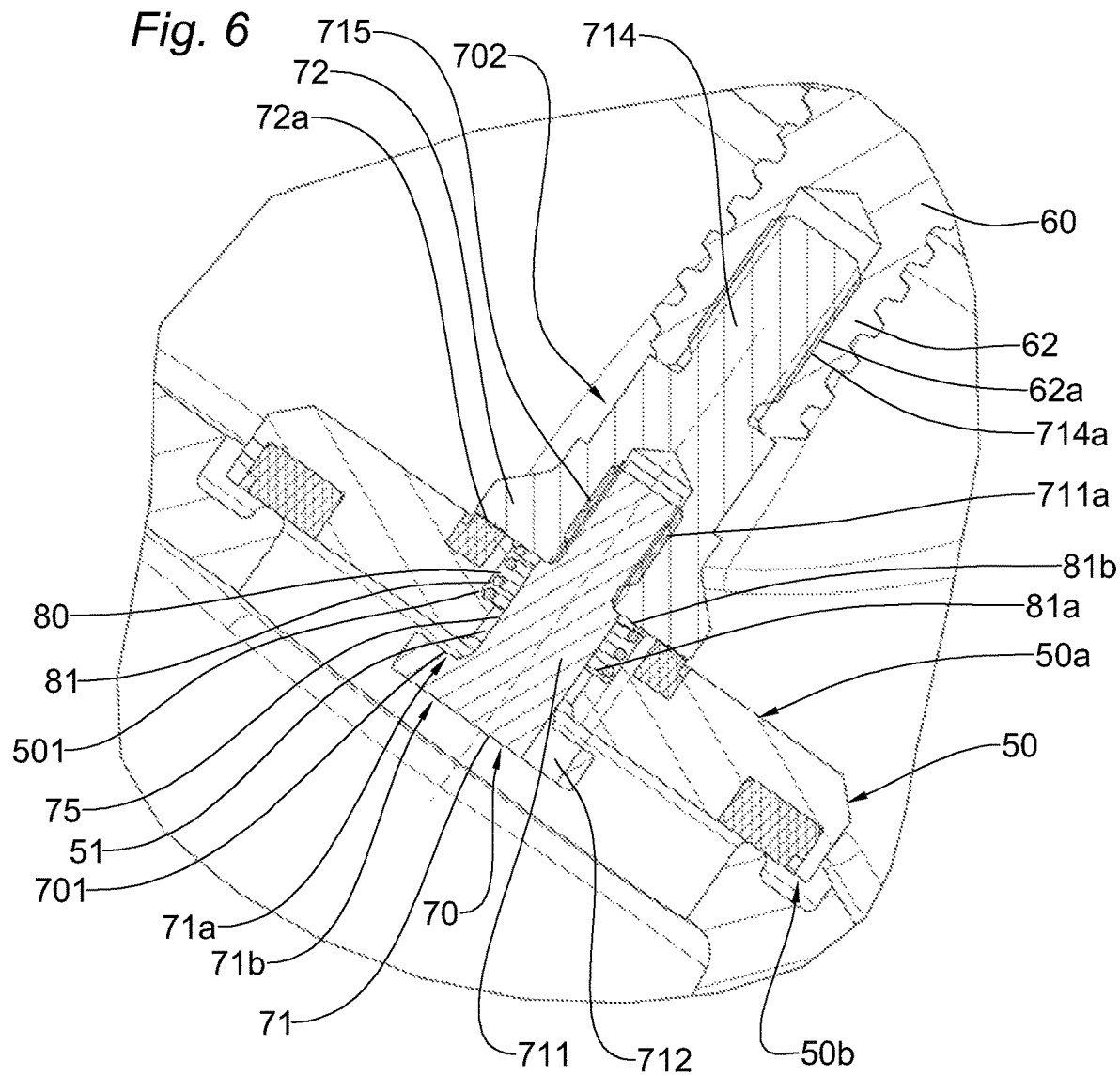
FIG. 6 is a schematic cross-sectional view of a detail of the flow regulator of FIG. 5.

As also set out in detail in FIG. 6, in this variant the engaging pin 70 is also composed of two members, a screw 701 and a piston 702 which are fixedly joined to each other.

The screw 701 has a head 71 which can retain the valve head 50 at the side of the second surface 50b and a rod 711 which extends into the hole 51 of the valve head 50 itself.

The head 71 has a first surface 71a which is directed towards the second surface 50b of the valve head 50 and a second surface 71b which is directed towards the second chamber 30 when the valve head 50 is in the closed position.

The rod 711 is composed of two portions 711a and 711b; the portion 711a projects through the hole 51 from the valve head 50 towards the first chamber 20 when the valve head 50 in in the 25 closed position while the portion 711b is received in the through-hole 51 of the valve head 50 when the engaging pin 70 is in the sealed position, and projects through the hole 51 from the valve head 50 towards the first chamber 20 when the engaging pin 70 is in the non-sealed position.

The piston 702 has a head 72 and an elongate portion 714.

The head 72 has a first surface 72a which is directed towards the first surface 50a of the valve head 50 and which can move into abutment against the first surface 50a when the engaging pin is in the sealed position.

The head 72 can be connected to the screw 701. With reference to FIG. 6, the head 72 of the piston 702 has a first surface 72a which is directed towards the first surface 50a of the valve head 50, this first surface 72a has a cavity 715 which can be connected in a secured manner to the rod 711 of the screw 71, in particular the cavity 715 of the piston 702 and the portion 711a of the rod 711 are threaded, and they are configured to be screwed together.

The elongate portion 714 can be connected in a secured manner to the second end 62 of the shaft 60. With reference to FIG. 6, this connection is brought about by screwing a threaded portion 714a of the elongate portion 714 to a threaded cavity 62a of the second end 62 of the shaft 60.

Alternatively, the connection between the piston 702 and the second end 62 of the shaft 60 can be brought about by means of a thrust bearing device.

The through-hole 51 of the valve head 50 receives in a sliding manner the portion 711b of the rod 711 of the screw 701.

The first surface 50a of the valve head 50 has a containment seat 501 which has a cylindrical shape and which can receive a compression spring 81.

The compression spring 81 therefore has a first base 81a which is supported on the first surface 50a of the valve head 50 in the containment seat 501 and a second base 81b which is in contact with the first surface 72a of the piston 702.

The compression spring 81 can act counter to the movement of the engaging pin 70 from the non-sealed position to the sealed position.

In particular, the containment seat 501 has such dimensions as to completely receive the compression spring 81 when the engaging pin is in the sealed position, that is to say, when the first surface 72a of the piston 702 is in abutment against the first surface 50a of the valve head, but not when the engaging pin is in the non-sealed position, that is to say, when the first surface 72a of the piston 702 is not in abutment against the first surface 50a of the valve head.

In this manner, the compression spring 81 maintains the engaging pin 70 in the non-sealed position when the valve head 50 is open.

The main axis of the containment seat 501, the compression spring 81, the elongate portion 714 of the piston 702 and the rod 711 of the screw 701 coincide with the axis X.

Figure 7:
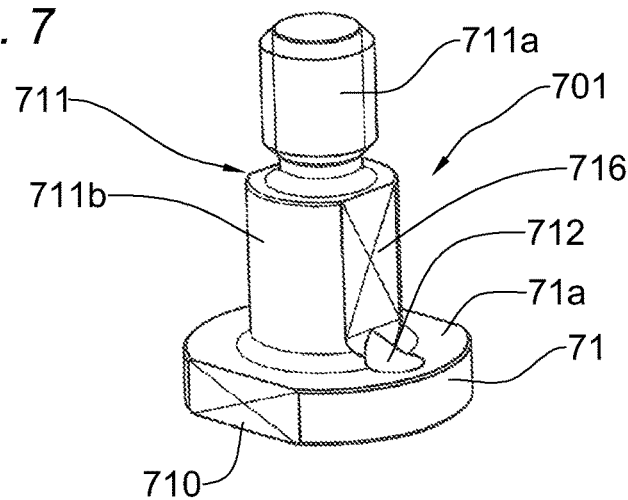
FIG. 7 is a schematic perspective side view, from above, of a detail of the flow regulator of FIG. 5.

The head 71 of the screw 701 has a through-hole 712 between the first surface and second surface 71a, 71b, as FIG. 7 shows.

The portion 711b of the rod 711 of the screw 70 has a milled portion 716 along an axis parallel with the axis X, thereby generating a passage 75 between the portion 711b of the rod 711 of the screw 701 and the hole 51 of the valve head 50 for the fluid communication between the first chamber 20 and the second chamber 30.

This passage 75 is open for passage between the two chambers 20, 30 when the engaging pin 70 is in the non-sealed position but is inaccessible when the engaging pin 70 is in the non-sealed position. In this manner, when the engaging pin 70 is in the non-sealed position, there is fluid communication between the first chamber 20 and the second chamber 30 through the passage 75 and the through-hole 712 of the head 71 of the screw 701, while this communication is prevented when the engaging pin 70 is in the sealed position, that is to say, when the first surface 72a of the head 72 of the piston 702 is in abutment against the first surface 50a of the valve head 50.

In this embodiment, the head 71 of the screw 701 may also have, in place of the through-hole 712, milled portions which are formed on the first surface 71a; in this case, the fluid communication between the first chamber 20 and the second chamber 30 when the engaging pin 70 is in the non-sealed position is brought about via the passage 75 and the milled portions of the head 71 of the screw 701.

Figure 8:
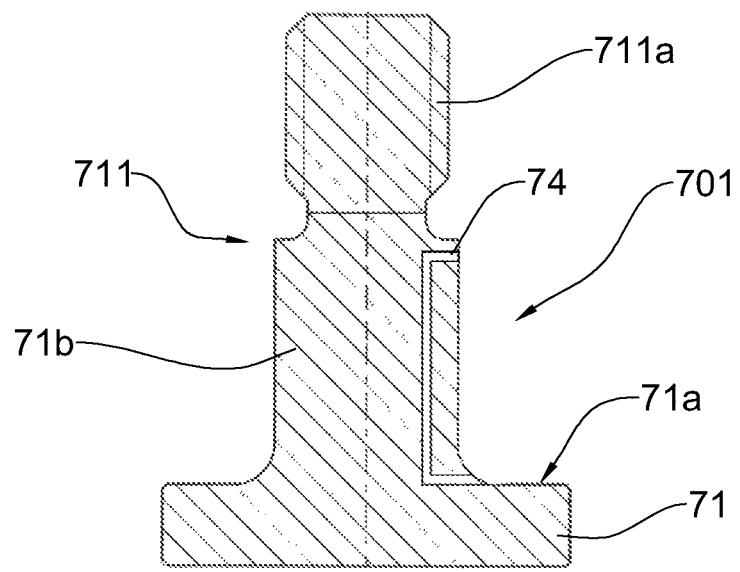
FIG. 8 is a schematic cross-sectional view of a detail of the flow regulator as an alternative to the one in FIG. 7.

Alternatively, as can be seen in FIG. 8, there is constructed in the portion 711b of the rod 711 a channel 74 for the fluid communication between the first chamber 20 and the second chamber 30; this channel 74 is open for passage when the engaging pin 70 is in the non-sealed position and is inaccessible when the engaging pin 70 is in the sealed position.

By acting by means of the shaft 60 which is secured to the engaging pin 70 which is in turn secured to the valve head 50, the operator initially also moves the flow regulator in this case from the first position to the second position by closing the valve head 50, and then moves it from the second position to the third position by moving the engaging pin from the non-sealed position to the sealed position, thereby compressing the compression spring 81 by means of the piston 702 in the containment seat 501 until the first surface 72a of the head 72 of the piston 702 moves into abutment against the first surface 50a of the valve head 50.

As FIG. 7 shows, the head 71 of the screw 701 has a circular cross-section which is truncated along two parallel chords 710, for example, and which is obtained by means of two milled portions, in order to facilitate the tightening of the screw 701 with respect to the piston 702.

Naturally, in order to comply with specific and contingent application requirements, a person skilled in the art may apply to the invention described above additional modifications and variants which are in any case included within the scope of protection as defined by the appended claims.

The invention claimed is:

1. A flow regulator comprising:
    a housing having a first chamber, a second chamber and a valve seat which is arranged between the first chamber and second chamber;
    a valve head which is arranged in the first chamber and which has at least a first surface which faces the first chamber, a second surface which faces the second chamber when the valve head is in a closed position and a through-hole between the first surface and second surface, the valve head being movable between an open position, spaced apart from the valve seat, and a closed position engaged with the valve seat;
    a shaft of the valve head which is capable of moving the valve head between the open and closed positions, and
    an engaging pin which is at least partially received in the hole of the valve head in a sliding manner, wherein the engaging pin comprises a first head, located in the second chamber, a second head, located in the first chamber, and a rod connecting the first head and the second head, the shaft being connected with the second head of the engaging pin by a thrust bearing device through which the shaft is rotationally disconnected with the second head of the engaging pin, the engaging pin being capable of moving with respect to the valve head between at least one non-sealed position, in which the fluid communication between the first chamber and the second chamber is allowed, and a sealed position, in which the fluid communication between the first chamber and the second chamber is prevented, the engaging pin being in the at least one non-sealed position when the valve head is in an open position and being capable of moving into the non-sealed position when the valve head is in a closed position, and at least one resilient element which is capable of acting counter to the movement of the engaging pin from the at least one non-sealed position to the sealed position, the resilient element being a compression spring interposed between the second head of the engaging pin and the first surface of the valve head, the first surface of the valve head having a respective containment seat defining an abutment surface facing the second head of the engaging pin, the compression spring being received in the respective containment seat adjacent the abutment surface.

2. The flow regulator according to claim 1, wherein the engaging pin is secured to the shaft and can be controlled in terms of movement between the at least one non-sealed position and the sealed position by means of the shaft.

3. The flow regulator according to claim 1, wherein the engaging pin has a first head, a second head and a rod, the second head being secured to the shaft and being capable of retaining the valve head at the side of the first surface, the first head being capable of retaining the valve head at the side of the second surface, the rod being at least partially received in the through-hole between the first surface and the second surface of the valve head, the engaging pin being able to slide in the hole between the at least one non-sealed position, in which the second head is not in abutment against the first surface of the valve head, and the sealed position, in which the first head of the engaging pin is in abutment against the first surface of the valve head.

4. The flow regulator according to claim 3, wherein the engaging pin comprises at least one first channel for the fluid communication between the first chamber and the second chamber, the at least one first channel being at least partially constructed in the rod and being open for passage when the engaging pin is in the at least one non-sealed position and inaccessible when the engaging pin is in the sealed position.

5. The flow regulator according to claim 1, wherein the containment seat for the compression spring is coaxial with respect to the through-hole between the first surface and the second surface of the valve head and the rod of the engaging pin is at least partially received in the internal space of the compression spring.

6. The flow regulator according to claim 1, comprising at least one passage for the fluid communication between the first chamber and the second chamber, the at least one passage being constructed between the engaging pin and the through-hole between the first surface and the second surface of the valve head and being open for passage when the engaging pin is in the at least one non-sealed position and inaccessible when the engaging pin is in the sealed position.

7. The flow regulator according to claim 1, comprising an annular fluid-tight seal on the second surface of the valve head which is capable of moving into abutment against the valve seat when the valve head is in the closed position.

8. The flow regulator according to claim 1, comprising an annular fluid-tight seal on the first surface of the valve head or, alternatively, on a first surface of the second head of the engaging pin which is capable of moving into abutment against the first surface of the second head of the engaging pin or the first surface of the valve head, respectively, when the engaging pin is in a sealed position.

9. The flow regulator according to claim 1, wherein the first chamber has a through-hole and the shaft extends through the through-hole of the first chamber so as to project at a first end outside the first chamber, the shaft being secured at a second end to the engaging pin.

* * * * *